United States Patent [19]

Rotter

[11] 4,123,332

[45] Oct. 31, 1978

[54] PROCESS AND APPARATUS FOR CARBONIZING A COMMINUTED SOLID CARBONIZABLE MATERIAL

[75] Inventor: Franz Rotter, Portland, Oreg.

[73] Assignee: Energy Recovery Research Group, Inc., Portland, Oreg.

[21] Appl. No.: 830,753

[22] Filed: Sep. 6, 1977

[51] Int. Cl.$^2$ ............................ C10B 1/06; C10B 1/10; C10B 47/20; C10B 47/30

[52] U.S. Cl. ........................................ 201/15; 201/25; 201/27; 201/33; 202/117; 202/137; 432/20; 432/113

[58] Field of Search ................. 201/2.5, 25, 33, 21, 201/15, 27; 202/117, 118, 137, 265; 48/209, 111; 432/20, 31, 112, 113

[56] References Cited

U.S. PATENT DOCUMENTS

| | | | |
|---|---|---|---|
| 1,413,802 | 4/1922 | Smith et al. | 202/137 |
| 1,488,248 | 3/1924 | Holzwarth | 432/112 |
| 1,972,929 | 9/1934 | Fisher | 202/118 |
| 2,680,084 | 6/1954 | Ryan | 432/112 |
| 2,973,306 | 2/1961 | Chick et al. | 201/33 |
| 3,362,887 | 1/1968 | Rodgers | 201/2.5 |
| 3,376,202 | 4/1968 | Mescher | 201/33 |
| 3,691,019 | 9/1972 | Brimhall | 201/33 |
| 3,751,214 | 8/1973 | Wenzel et al. | 432/112 |
| 4,030,984 | 6/1977 | Chambers | 201/2.5 |

FOREIGN PATENT DOCUMENTS 257,479   9/1926   United Kingdom .................... 202/117

Primary Examiner—Morris O. Wolk
Assistant Examiner—Bradley Garris
Attorney, Agent, or Firm—Marn & Jangarathis

[57] ABSTRACT

Process and apparatus for treating a comminuted solid carbonizable material, such as comminuted municipal waste; sawdust, granulated coal, shredded tires and the like wherein the material is caused to be pyrolyzed in a horizontally disposed elongated reaction zone essentially free of any oxygen containing gases at ambient pressure and at a temperature of from 400° C. to 900° C. The material is passed through the reaction zone by paddle-like impellers mounted on a shaft while being subject to an indirect heat transfer relationship via a burning air fuel mixture spirally swirling within a heating zone about the reaction zone and the mixture being withdrawn from a lower portion of the heating zone. During pyrolysis, the material is chemically changed into valuable gaseous, liquid and solid products.

26 Claims, 3 Drawing Figures

PROCESS AND APPARATUS FOR CARBONIZING A COMMINUTED SOLID CARBONIZABLE MATERIAL

BACKGROUND OF THE INVENTION

This invention relates to the treatment of a solid carbonizable material, such as coal, shredded waste tires, comminuted municipal waste, sawdust and wood shavings and the like to convert such material into valuable products including combustible gases, liquid hydrocarbons and solid carbonaceous residues, and more particularly to the treatment of such a carbonizable material in a moving bed pyrolysis process and apparatus within a substantially horizontal high temperature zone.

The concept of recovering combustible gaseous, liquid hydrocarbons and usable coarbonaceous solid residues from coal and from municipal and industrial wastes has received increased attention with the rising costs of solid, liquid and gaseous fossil fuels and concomitant problems with conventional means of disposal or utilization of solid wastes. With respect to solid wastes, the intrinsic energy therein is a valuable resource which need not be wasted.

Solid waste disposal in the U.S. has become a major problem. At this time, approximately 8 pounds of solid waste is generated per capita per day. The present methods for disposing of municipal wastes are wholly inadequate with about 90 percent of such collected wastes being disposed of in landfill areas. Municipal incineration of wastes has been highly curtailed because of high costs of providing and operating incineration facilities which meet air pollution standards. Of particular concern in solid waste management is the handling of nearly 200 million waste rubber tires which are discarded each year in the U.S. If burned in municipal incinerators, rubber tires give off large quantities of unburned hydrocarbons with the smoke generated by tire combustion being highly visible and noxious requiring expensive control equipment to meet air pollution regulations. Tire disposal is also troublesome in sanitary landfills since whole tires, compacted in bulk into landfills, spring back to their former shape and tend to work-up during settling of the fill. Ultimately, whole tires emerge at the surface where their appearance is objectionable and offer refuge for rats and other disease carriers. Furthermore, tires are highly resistant to natural decomposition making them a permanent and ever increasing solid waste problem. The heat value per pound of tires, which is equal to or greater than that of coal, has suggested the feasbility of waste tires as a fuel, either in a supplementary role or as a sole source of energy, and several pilot studies of such use are underway at the present time.

Advocates of the development of energy sources other than gaseous and liquid fossil fuels have begun to re-examine coal gasification processes in view of the substantial reserves of such form of fossil fuels and the increasing costs of transporting coal to ultimate sites of utilization. Also, the wood processing industry is receiving increased attention as an untapped energy reservoir. Wood processing operations generate large volumes of wood and bark residues. Bark, chips, sawdust, sanding dust, shavings and trimmings comprise more than half of the volume of the original log.

There are three basic thermal techniques currently seen as feasible alternatives for producing energy from waste tires, municipal solid wastes and the like: (1) direct combustion of the raw or semi-processed solid waste in a grate-fired steam generator; (2) mechanically processing the organic fraction of the solid waste into a more readily usable form so that it can be burned by itself or as a supplement to other solid or liquid fossil fuels in a suspension or semi-suspension-fired steam generator; and (3) the pyrolysis or destructive distillation of the organic fraction of the solid waste into gaseous and/or liquid products which can be substituted for or used in conjunction with solid, liquid, or gaseous fossil fuels in steam generators or gas turbines. The thermal method of handling solid waste, carbonizing coal and wood residue which is gaining increased attention is that of deomposition of the solid material by pyrolysis. The term "pyrolysis" as used in the art means the chemical decomposition of a material by the action of heat in the absence of oxygen. Since the pyrolysis is performed in an essentially oxygen-free atmosphere, the solid waste material, coal or wood residue does not burn. Hence, the solid feed material decomposes into products which include steam, gases, liquids, tars and solid residues including coke, char and non-carbonizable materials as may have been contained in the feed material.

There appears to be two major reasons why solid waste, coal and wood conversion by pyrolysis is attracting attention. First, pyrolysis potentially makes refuse disposal a profitable operation and provides an attractive means of converting wood and solid fuels to liquid and gaseous energy sources. Substantially all of the end products (gases, liquids and solid residues) of pyrolytic conversion have economic value. Second, air-borne pollutants can be kept at very low levels.

Existing pyrolysis reactors tend to be bulky in size to accomodate large volumes of waste material to be processed and operate on a batch system of material treatment or have elaborate mechanisms to seal the reactor during its operation to preclude the escape of the reactor gases and/or the entry of oxygen or oxygen containing gases. The size of such reactors, their material feed devices and need for elaborate sealing systems obviously contribute to their high initial capital equipment cost and high cost of operation.

OBJECTS OF THE INVENTION

Accordingly, an object of the present invention is to provide a novel process and apparatus for converting solid waste material and other solid carbonizable material to valuable products including combustible gases, liquid hydrocarbons and solid carbonaceous residues.

Another object of the present invention is to provide an economical process and apparatus as a result of high utilization of material handling capacity of the apparatus at relatively low operating costs.

Still another object of the present invention is to provide a novel process and apparatus which enables the conversion of a wide variety of solid material under close pyrolytic control to maximize recoverable energy from the treated solid material.

A further object of the present invention is to provide a process and apparatus for the pyrolysis of solid material wherein the gases recovered from the pyrolysis are utilized, at least in part, to provide the fuel reqirements for the process and apparatus.

A still further object of the present invention is to provide a novel process and apparatus to convert a wide variety of solid carbonizable materials to valuable products including combustible gases, liquid hydrocarbons and solid carbonaceous residue while minimizing environmental pollution.

SUMMARY OF THE INVENTION

These and other objects of the present invention are achieved in a pyrolytic conversion process and apparatus wherein the material to be treated (in shredded, comminuted or particulate form) are continuously introduced into the inlet end of an elongated, cylindrical, and substantially horizontal pyrolysis reaction zone under conditions to effectively exclude oxygen containing gases. The material entering the reaction zone is continuously conveyed with agitation through the zone to its outlet end as a material's bed by a plurality of paddle-like impellers mounted on a rotatable shaft extending through the zone. The bed of solid material is heated to a pyrolyzing temperature of from about 400° C. to about 900° C. by radiant and conductive heat transfer. The material comprising the moving bed within the reaction zone is thermally and progressively broken down into valuable products including gases, liquids and solid carbonaceous residues.

BRIEF DESCRIPTION OF THE DRAWINGS

The invention will be more clearly understood by reference to the following detailed description of an exemplary embodiment thereof in conjunction with the accompanying drawings wherein like reference numerals designate like parts throughout, in which.

DETAILED DESCRIPTION OF THE INVENTION

Figure 1:
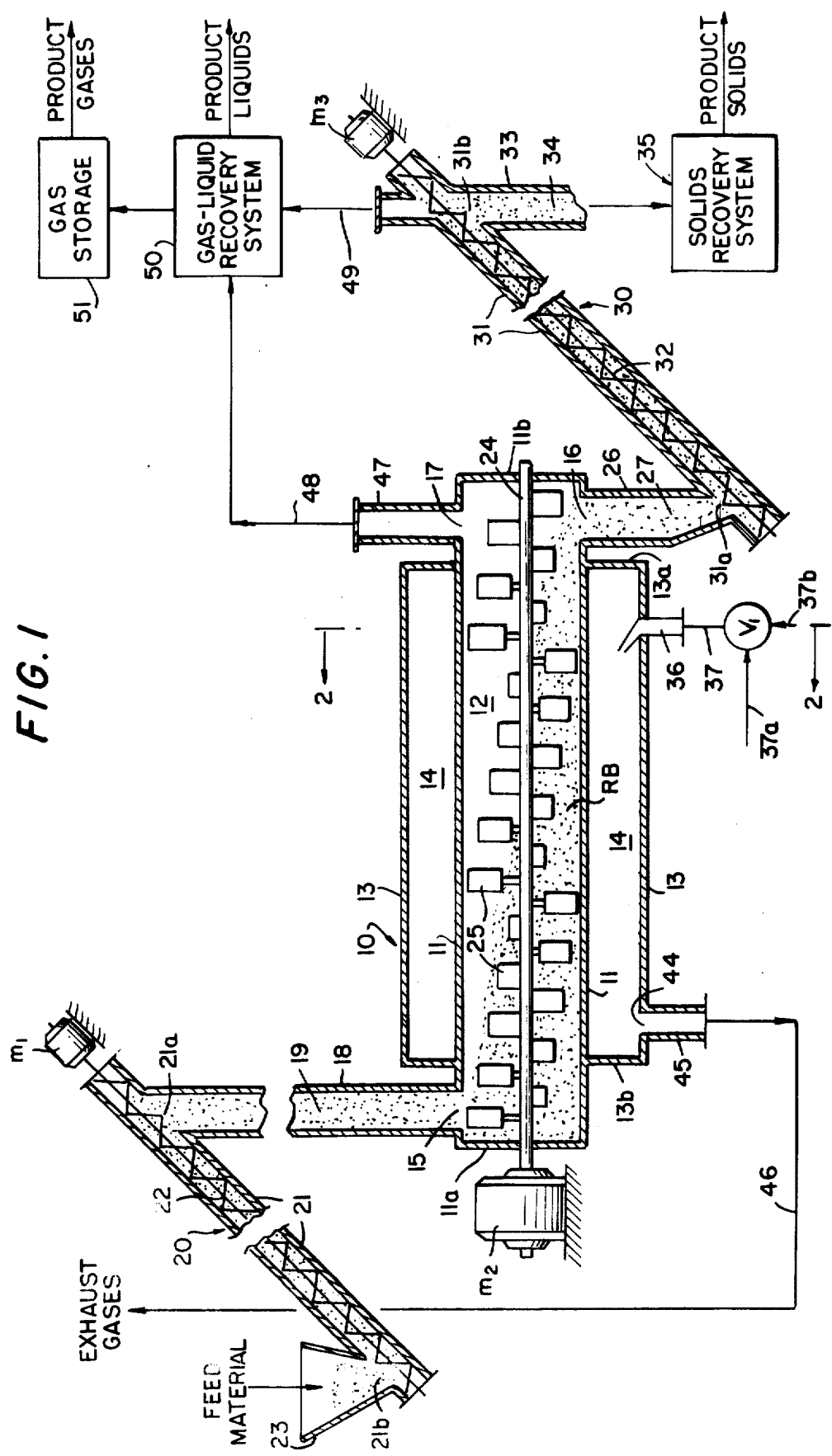
FIG. 1 is a side elevation, longitudinally sectioned, partially schematic and fragmentary view of pyrolysis apparatus for treating solid carbonizable material in accordance with the present invention.

Residential and commercial post-consumer solid waste (according to a 1973 estimate by the U.S. Environmental Protection Agency) is typically comprised of: 71.1 percent non-food product waste (paper 38.9%, glass 10.3%, metals 9.9%, plastics 4.1%, rubber and leather 2.7%, textiles 1.6% and wood 3.6%); 13.3 percent food waste; and 15.6 percent yard and miscellaneous inorganic wastes. Roughly 70 to 80 percent by weight of urban waste is combustible with reported heating values ranging of from 4,500 Btu per pound to about 6,500 Btu per pound. With metals and glass substantially removed by known magnetic separation and air classification techniques, the bulk density of the material (comminuted to a size of one inch or less) is in the range of about 12 to about 24 pounds per cubic foot.

Approximately half the volume of wood harvested in the U.S. is unused in the form of bark, wood chips, sawdust, sanding dust, shavings and trimmings. These wood residuals have an as-produced heating value of about 4,000 to about 7,500 Btu per pound and are convertible by pyrolysis to gases and oils of even higher heating value per pound. On a dry basis most woods have a heating value of about 8,300 Btu per pound. The bulk density of wood shavings and sawdust is in the range of about 6 to about 12 pounds per cubic foot.

As compared to municipal wastes and wood wastes, which have heating values averaging between about 5,300 Btu per pound to about 8,300 Btu per pound (dry basis), respectively, scrap tires have heating values in the range of about 14,000 Btu per pound to about 15,000 Btu per pound exceeding heating values of common types of coal. The bulk density of chopped or shredded scrap tires ranges from about 26 pounds per cubic foot to about 38 pounds per cubic foot.

Coal, as a potential solid material for pyrolytic conversion to combustible gases, liquids and coke, has heating values in the range of about 11,500 Btu per pound to about 14,300 Btu per pound with an average value of about 13,000 Btu per pound. Coal is commonly reported to have an average bulk density of about 42 pounds per cubic foot with a bulk density range of from about 40 to about 48 pounds per cubic foot.

Figure 2:
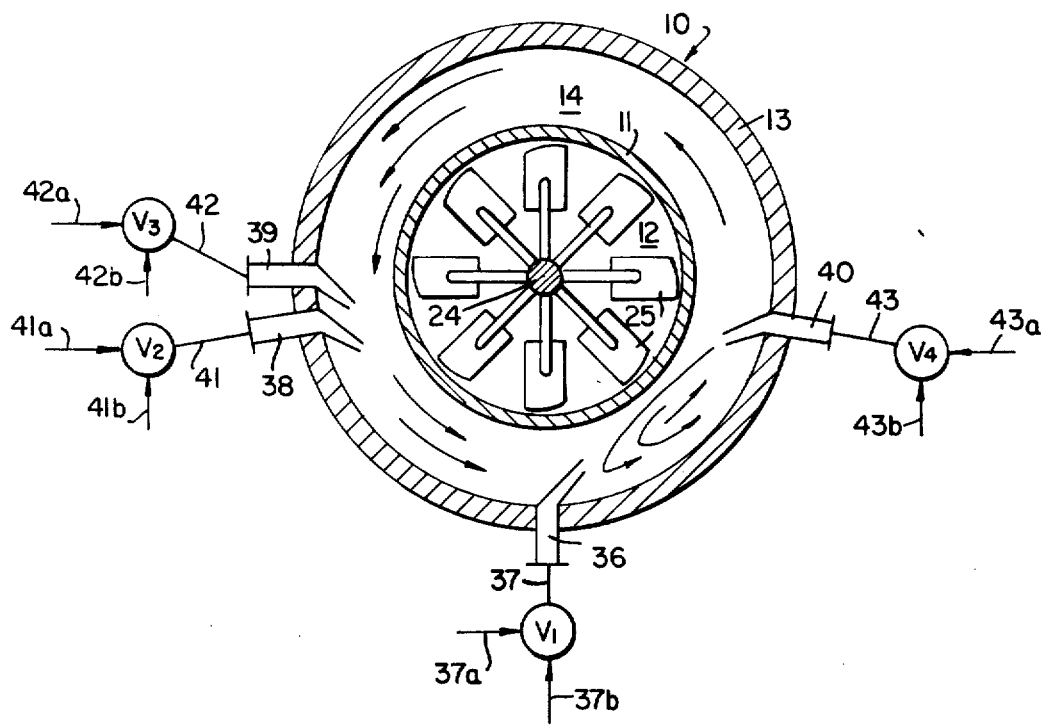
FIG. 2 is a sectional view of the pyrolysis apparatus of the present invention taken through line 2—2 of FIG. 1.

Referring now to FIGS. 1 and 2 there is illustrated a preferred pyrolysis reaction system and associated solid materials feed and discharge apparatus constructed for continuously handling and treating solid carbonizable material of the types hereinabove described for converting same into valuable gases, liquid hydrocarbons and solid residue.

The pyrolysis reaction system 10 includes an elongated pyrolysis reaction vessel 11 of cylindrical configuration defining a pyrolysis reaction zone 12. The reaction vessel 11 has an end wall 11a at its inlet end and an end wall 11b at its outlet end. Surrounding the reaction vessel, and spaced therefrom, is a jcaket or vessel 13 which defines with reaction vessel 11 an annular heating zone 14. The jacket or vessel 13 has end walls 13a and 13b. The jacket 13 extends substantially co-extensively along a major portion of the elongated reaction vessel 11. At the upper portion of reaction vessel 11 proximate the end wall 11a there is provided a reaction zone feed material inlet 15 and at the lower portion of the vessel 11 proximate end wall 11b, there is provided a reaction zone solid residue outlet 16. The upper portion of the reaction vessel 11 proximate the end wall 11b is provided with a reaction zone gas-vapor outlet 17.

The reaction vessel 11 and jacket 13 are constructed of high temperature nickel/steel alloy materials or other suitable materials capable of withstanding high temperature pyrolysis during conversion of the solid material of this invention. The vessel 11 and jacket 13 are supported by appropriate structure (not shown) and are, at least over exterior surfaces enclosed with appropriate heat insulating material and structure (not shown).

Communicating with the reaction zone 12 is a feed material inlet pipe or conduit 18 extending in a substantially vertical orientation (from the feed material inlet 15 in the reaction vessel 11) of a length sufficient such that the solid feed material form a gravity packed feed material column 19 which effectively seals at inlet end 15 of the reaction zone 12 from oxygen containing gases. In some instances, it may be desirable to include a rotary air lock mechanism of well-known construction near the upper end of the feed material conduit 18 to further assure the exclusion of oxygen containing gases from the reaction zone 12 when the bulk density of the feed material is extremely low (for example fluffed municipal waste) since gravity packing of a column of the low density material may not adequately seal the reaction zone 12.

A feed material storage and conveying system, generally indicated as 20 is provided for supplying solid carbonizable material to the material inlet conduit 18 and is positioned adjacent the inlet end of the reaction zone 12. Such system 20 is comprised of an elongated feed material conveyor housing 21 in which is positioned auger 22 of common design. The conveyor housing 21 includes at its upper end a materials exit port 21a connected to and in communication with the upper end of conduit 18 whereby feed material conveyed upwardly through the housing 21 by the rotating action of the auger 22 is discharged through the port 21a into the conduit 18 to form material column 19. At the lower end of the conveyor housing 21, there is provided a material receiving port 21b connected to and in communication with the bottom opening of a material storage hopper 23 whereby feed material stored within such hopper are gravity fed to the conveyor housing 21 through port 21b (upon demand of the auger 22 through its rotation). The auger 22 is rotated by a motor $M_1$ in response to material sensing means (not shown) of known type located within inlet conduit 18 so as to maintain a full column 19 within inlet conduit 18.

Extending axially through the pyrolysis reaction zone 12 is a rotatable shaft 24 mounted for rotation through end wall 11a and end wall 11b of the vessel 11. Appropriate shaft-to-wall vapor seals (not shown) are provided with the shaft 24 being preferably mounted in self-aligning bearings (not shown) of any well known construction. The shaft 24 is preferably provided over its entire length within the reaction zone 12 with a plurality of paddle-like impellers 25 disposed in sequence about the circumference thereof in the form of a broken helix. The impellers 25 preferably do not contact the inner surface of reaction vessel 11 but are of such length that relatively little clearance is provided between the impellers 25 and the inner surface of the vessel 11. The spacing and shape of the impellers 24 are such that upon rotation of the shaft 24, the entire inner surface of the reaction vessel 11 is exposed to the action of the impellers 25. The impellers 25, upon rotation of shaft 24, cooperate and act to convey material (entering the reaction zone through inlet 15) as a reaction bed RB of decreasing thickness from the inlet end to the outlet end of the reaction zone 12 and to continuously agitate the material forming such reaction bed RB. The solid materials of the reaction bed RB are heated to pyrolyzing temperatures by radiant heat energy eminating from the wall of reaction vessel 11 above the upper surface of the materials bed RB and radiated to the top of such bed, and by conductive heat energy passing through the wall of the reaction vessel 11 below the bed surface and directly into the bed. The shaft 24 is rotated by a variable speed motor $M_2$ controlled as to its r.p.m. in relation to the predetermined through put rate of the material passing through the reaction zone 12.

Solid carbonaceous residue formed within the reaction zone 12 during pyrolysis of the solid carbonizable material is moved toward the outlet end and leave the reaction vessel 11 through outlet 16 through a solid residue outlet conduit 26. The solid residue within outlet exit conduit 26 form a gravity packed column 27 to contribute to the sealing at the outlet end of the reaction zone 11 from oxygen containing gases.

A solid residue conveying and storage system, generally indicated as 30 is provided for receiving solid carbonized residue from outlet conduit 26 adjacent the outlet end of the reaction zone 12. Such system 30 is comprised of an elongated solid residue conveyor housing 31 provided with an auger 32 of common design and at its lower end with a solid residue inlet port 31a connected to and in communication with the lower end of outlet conduit 26 whereby solid residue passing downwardly through such conduit 26 are introduced into the conveyor housing 31. The auger 32 is driven by motor $M_3$ and conveys solid residue from outlet conduit 26 through inlet port 31a within conveyor housing 31 to conveyor outlet port 31b whereat such solid residue pass downwardly by gravity through solid residue conduit 33 as a packed second solid residue column 34. The solid residue of column 34 is passed to a solid's recovery system 35 (schematically shown in FIG. 1) wherein solid carbonaceous product materials and non-carbonized materials are separated. The solid residue conveyed through conveyor housing 31 and passing as a packed column through conduit 33 cooperate with the solid residue in outlet conduit 26 to effectively seal at its outlet end the reaction zone 12 from oxygen containing gases.

The reaction vessel 11 and enclosed reaction zone 12 are heated by combustion of fuel within the annular heating zone 14 defined by the reaction vessel 11 and jacket 13. During start-up, the reaction zone 12 is brought up to pyrolyzing temperatures by fuel being burned in heating zone 14 and provided from a source external to the process and apparatus of the present invention. Thus, a starter burner, for example, 36 is provided in the heating zone 14 and is fed with an appropriate air-fuel mixture by line 37. The air-fuel mixture is regulated and controlled by a mixing and regulating valve $V_1$ which receives fuel through line 37a and air through line 37b. An appropriate igniter mechanism (not shown) is provided within the heating zone 14 adjacent the starter burner 36 for initiating combustion of the air-fuel mixture.

After the pyrolysis reaction zone 12 is raised to a temperature at which conversion of feed material is commenced and combustible off-gases are generated and processed through the associated gas-vapor treatment plant (described hereinafter), part or all of such combustible gases may be returned to the pyrolysis reaction system 10 for use as fuel for maintaining the pyrolysis reaction. In operational pyrolysis mode, a plurality of burners 38, 39 and 40 are provided for the heating zone 14 and fire an appropriate air-fuel mixture through lines 41, 42 and 43, respectively. The air-fuel mixture for each of the burners 38, 39 and 40 is regulated and controlled by a mixing and regulating valve $V_2$, $V_3$ and $V_4$, respectively, each of which receives fuel through lines 41a, 42a and 43a, respectively, and air through lines 41b, 42b and 43b, respectively. Since a combustion is already being effected in heating zone 14 utilizing starter burner 36, the burners 38, 39 and 40 are ready for ignition thereby eliminating any igniter mechanism for such burners.

In a preferred burner arrangement, referring to FIG. 2, two of the burners 38 and 39 are positioned on one side of the jacket 13 with the third burner 40 being located on the opposite side of the jacket 13. Each of the burners 38, 39 and 40 (all located in the vicinity of the material outlet end of the system) projects the combustible air-fuel mixture issuing therefrom toward the lower portion of the heating zone 14 in a direction tangential to the vessel 11 and in a direction toward the material inlet end of vessel 11. The arrangement of the burners is such that initially the burning air-fuel mixture of burner 40 moves annularly towards the burning air-fuel mixture issuing from burners 38 and 39. Upon meeting, the burning mixtures of all burners are thoroughly mixed and move together annularly as a spiralling heating medium toward the material inlet end of the pyrolysis reaction system in a direction of rotation dictated by the dominating multiburner arrangement, i.e. burners 38 and 39, on one side of the jacket 13. It should be understood that the specific number and arrangement of burners firing into the heating zone 14 in the vicinity of the material outlet end of the reaction system may be altered to take into account variations in the volume and dimensions of the annular heating zone 14 and process heating requirements. It is important, however, that the selected burner combination and arrangement result in heavy and thorough mixing of the combustible and combusting air-fuel streams adjacent the lower portion of the reaction vessel (towards the middle thereof) and the development of a spiralling high temperature heating medium moving within the heating zone toward the material inlet end of reaction system.

The heating zone 14 is provided with a combustion gas outlet 44 with the completely burned exhaust gases being removed at such outlet 44 through outlet conduit 45 and line 46 for discharge to atmosphere or to appropriate air pollution control apparatus (not shown), if required. Thus, in accordance with the present invention, the heating medium within the heating zone 14, while spiralling about the reaction vessel 11, moves in a direction counter-current within the heating zone to the direction of movement of the material reaction bed with the reaction zone 12. Normally, hot combustion gases within a heating zone are withdrawn from the upper portion of such a heating zone. It has been found that by locating the combustion gas outlet 44 at a point below a horizontal plane drawn through the axis of the jacket 13, preferably adjacent the material inlet end of the reaction vessel 11, that the combustion exhaust gases are non-polluting to the atmosphere, with nominal, if any, treatment, e.g. water scrubbing.

Gases and vaporized liquids generated from the solid carbonizable material introduced into the reaction vessel 11 by the pyrolysis reaction carried on therein, including steam, leave the reaction vessel 11 through gas outlet 17 as a gas-vapor mixture and are withdrawn through a gas-vapor outlet conduit 47 by line 48 under a slightly negative pressure and in a manner so as to avoid the entrance of any oxygen containing gases into the reaction zone 12. Residual gases or vapors, if any, entrained with the solid residue leaving the reaction zone 12 through outlet 16 may be separated from such residue by applying a negative pressure to a gas-vapor line 49 located adjacent the upper end of conveyor housing 31 of the solid residue conveying and storage system 30. The gases and vapors of lines 48 and 49 are thereafter passed to an associated gas-liquid recovery system, generally indicated as 50, of appropriate and well-known design, wherein condensible vapors and non-condensible gases are separated from one another thereby yielding product liquids (broad range of liquid hydrocarbons) and combustible gas or gases (principally a mixture of $CO_2$, $CO$, $H_2$, $CH_4$, $C_2H_6$, $C_3H_8$, etc.) which may be passed to a gas storage facility, generally indicated as 51, and comprise the product gases produced by the process and apparatus of the present invention. As hereinabove mentioned, product gas and/or gases of the process are combustible and have a relatively high heating valve making them most suitable, if desired, as the fuel source for pyrolysis burners 38, 39 and 40.

The pyrolysis of municipal waste, scrap tires, wood waste, coal and like carbonizable materials is an endothermic process. It is necessary to rapidly heat the material to a high temperature and then add sufficient additional heat energy to allow and complete chemical decomposition or destructive distillation of such material. The process must be accomplished in a substantially oxygen-free atmosphere. The temperatures required for the pyrolysis of a given material are substantially equivalent to the temperatures required for combustion of the material in the presence of oxygen.

In accordance with the pyrolysis process of the present invention, solid carbonizable material (such as municipal waste, scrap tires, wood waste, coal and the like) is prepared for charging to the reaction system by any well-known comminuting, crushing, shredding, chopping, pulverizing or particulating technique appropriate for forming the material into units or pieces of about one inch maximum dimension or less. Larger material units or pieces of a size of up to about four inches or more maximum dimensions may be utilizable in the process, provided such units or pieces are capable of free-flow in material storage bins and hoppers and material transfer equipment. In the case of municipal waste material, in addition to appropriate comminution thereof, metal and glass pieces are removed by well-known magnetic separation and air classification techniques prior to introduction of same into the pyrolysis reaction system. Additionally, it may in some instances be necessary to dry and aerate such refuse prior to processing.

In operation, carbonizable material, appropriately prepared for pyrolytic treatment as described above, is stored in the feed hopper 23 comprising part of the feed material storage and conveying system 20. Upon rotation of the auger 22 and influence of gravity, feed material from the hopper 23 enters conveyor housing 21 through port 21b and is conveyed by augur 22 to the upper end 21a of the housing 21 and then to the materials inlet conduit 18. The feed material descends downwardly by gravity through conduit 18 as an elongated packed column 19. Feed material from the packed column 19 is introduced into the pyrolysis reaction zone 12 through inlet 15 and is conveyed through the reaction zone 12 by the plurality of paddle-like impellers 25 circumferentially disposed in sequence about the rotatable shaft 24. Rotation of the paddle-like impellers 25 cause the material to be conveyed through the reaction zone 12 toward the outlet end as a continuously moving reaction bed RB of decreasing thickness from the inlet end to the outlet end.

During pyrolysis, feed material is continuously introduced into conduit 18 so that the material column 19 is packed in arrangement and is of sufficient length to effectively seal the reaction zone from oxygen containing gases. As material moves downwardly into the reaction zone 12, a sensing means positioned (not shown) near the upper end of conduit 18 continuously monitors feed material requirements to the material column 19. The sensing means through appropriate control means directs the energization of variable-speed motor $M_1$ thereby rotating auger 22 at an appropriate rate to deliver feed material to the upper end of conduit 18 to thereby maintain column 19.

As previously stated, the material is passed through the pyrolysis reaction zone 12 in response to the rotation of shaft 24 and thus the forwardly conveying action of impellers 25, as a reaction bed RB (solids being converted to gas and vapors). The reaction bed of decreasing thickness is agitated by the impellers 25 whereby the particulate or comminuted materials forming the bed are exposed to various parts of the bed and reactor environment. Thus, the solid material of the bed is heated to pyrolyzing temperatures in the range of from about 400° C. to about 900° C. by radiant heat transfer (eminated from the wall of the reaction vessel to the upper surface of the bed) at or near the upper surface of the bed and by conductive heat transfer passing through the wall of the reaction vessel below the bed surface.

Soli carbonaceous residue formed within the pyrolysis reaction zone 12 is withdrawn from the reaction vessel 11 through outlet 16 and is formed (by gravity) into a packed column 27 within solids outlet conduit pipe 26 contributing to the sealing of the reaction zone from external oxygen containing gases. As solid particulate residue (including any non-carbonized materials contained in the reactor feed material) fills the conduit 26, a materials sensing device directs the energization of variable-speed motor $M_3$ rotating solid residue auger 32 (within housing 31) at a rate to appropriately remove solid residue from the lower end of conduit 26 and convey same to the upper end of second column 34 contained within and defined by conduit 33. The solid residue in pipe 33 flows by gravity therethrough and is passed to solids recovery system 35. The solid residue conveyed through housing 31 by auger 32 and passed as a gravity packed column through conduit 33 cooperate with the solid residue in outlet conduit 26 to effectively seal the reaction zone from oxygen containing gases. Depending upon the nature of the solid carbonizable feed material introduced into the pyrolysis system, the solid residue will be comprised of coke, charcoal, char, carbon black, ash, and non-carbonized materials contained in the feed material (and mixtures of the foregoing). The coke, charcoal and char materials may be utilized as a solid fuel. Carbon black and other charcoal-like residue material may be particularly suitable for use as rubber additives. In addition, the charcoal-like substances may be used as sewage clarification materials, decolorization substances, or as filtering agents in water purification processes.

The gas-vapor mixture (resulting from the pyrolysis of carbonizable materials of the type capable of being processed by the present invention) is withdrawn from the reaction zone 12 through gas-vapor outlet 17 and is passed through conduit 47 and gas-vapor line 48 to the gas-liquid recovery system 50. The passage of such mixture from the reaction system to the recovery system may be assisted by the application of a slightly negative pressure to the line 48 by a jet ejector apparatus of the type normally comprising a component of such a recovery system. As previously described, the gas-vapor mixture comprises valuable fuel gases, condensible oil, steam and entrained solid carbonaceous particles. The oil comprises a complex mixture of aliphatic, olefinic and aromatic hydrocarbon products. Within the gas-liquid recovery system one or more fractions of heavy, medium heavy and light oils are condensed and collected for use and/or further treatment by well-known methods.

Since the material to be treated is maintained as a moving reaction bed RB of decreasing thickness from inlet to outlet ends of the reaction zone, three areas of reaction treatment are effectively established therein and generally comprise: a material preheat area wherein the bed is relatively thick (adjacent the inlet end); a principal pyrolysis reaction area along the mid-section of the reaction zone 12 wherein the bed is of decreasing thickness is heated to maximum pyrolyzing temperatures; and a final reaction area wherein the substantially carbonized residual material is lightly agitated and advanced as a relatively thin bed to the solid residue outlet 16 of the reaction zone. Within the final reaction area essentially complete carbonization of the feed material at the final reaction temperature (considerably reduced in size via the pyrolysis or destructive distillations reactions occurring within the reaction zone) is accomplished.

Since the feed material undergoing pyrolysis within reaction zone 12 forms a reaction bed of decreasing thickness from inlet to outlet ends, the effective material through put volume of the reaction zone is approximately one-half of the actual volume of such zone. Thus, the reactor vessel turnover-time or material through put rate for the pyrolysis reaction system is established for each type of carbonizable feed material in relation to the bulk density of the material. The specific pyrolysis temperature conditions (within the preferred general temperature range) established within the reaction zone 12, via the heat generated in the surrounding (annular) heating zone 14, principally dictate the quantity distribution and nature of the fuel gases and liquid hydrocarbons produced during pyrolysis and the amount and nature of the carbonaceous material comprising the solid residual portion of the products of the pyrolysis reaction.

Combustion of fuels within the annular heating zone 14 proceeds from the appropriate arrangement of burners located in the vicinity of the outlet end of the reaction system 10. As previously described, initial combustion is accomplished via a starter burner assembly utilizing liquid or gaseous fuel supplied from a source external to the reaction system and associated gas-vapor treatment system of this invention. After the reaction zone is raised to operational temperatures whereat conversion of the feed material commences and combustible off-gases are generated and processed through the gas-liquid recovery system, part or all of such combustible gases may be returned to the pyrolysis reaction system 10 for use as heating fuel. Thus, during continuous operation of the pyrolysis reaction system fuel gases (produced by the system) may be mixed with appropriate quantities of air to be burned in the heating zone with the hot gases of combustion encircling the pyrolysis zone and proceeding to the exhaust gas outlet 44 at the bottom of the heating zone 14 adjacent the material inlet end 15 of the reaction vessel 11.

To effect pyrolysis reactions requiring temperatures in the range of from about 400° C. to about 900° C. within the reaction zone 12, the temperature of heating gases within the heating zone must range between about 750° C. and about 1000° C. with the highest heating condition preferably occurring along the mid-section of the heating zone 14. By utilizing the relatively clean high Btu fuel gas product of the pyrolysis reaction and gas-liquid recovery systems described hereinbefore and accomplishing substantially complete combustion of such fuel gas within the heating zone 14 of the pyrolysis reaction system, the combustion gas leaving the system via gas outlet conduit 45 via line 46 may be discharged directly to the atmosphere as non-polluting gas-vapor stream.

Appropriate sensing devices (not illustrated in the drawings) are associated with the jacket 13 and the reaction vessel 11 for monitoring the heating and processing temperature conditions therein and for controlling and regulating such conditions by adjustment of the air-fuel feed mixtures to obtain desired pyrolysis temperatures within the reaction zone for the material being treated.

Figure 3:
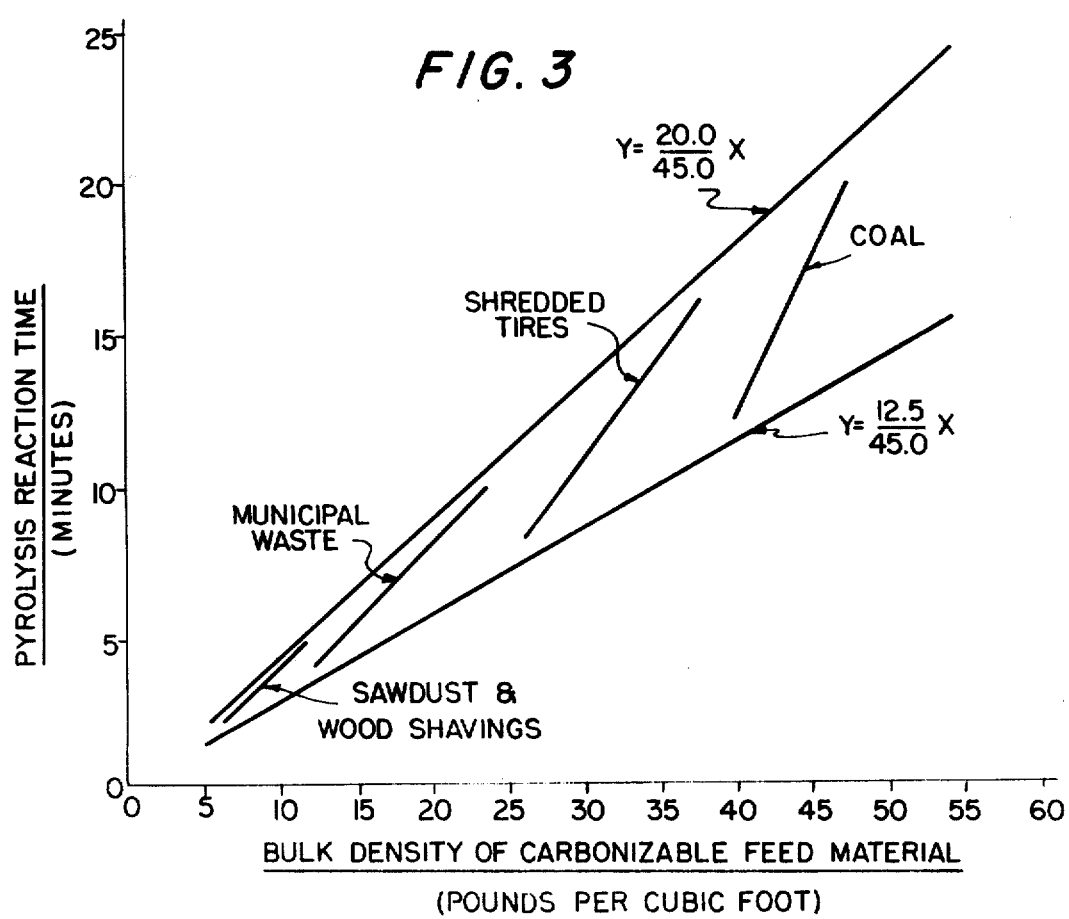
FIG. 3 is a graphic presentation of the relationship between the bulk density of shredded, comminuted and particulate solid carbonizable material of the type utilized in the process and apparatus of the present invention and the processing time required to obtain desired end products.

As hereinbelow discussed the through put rate for the feed material being treated in accordance with the present invention is believed to be related to the bulk density of such material. FIG. 3 is a graphic presentation of the relationship which has been discovered between the bulk density of shredded, comminuted, crushed, pulverized or otherwise particularized carbonizable solid material of the type utilized in the process and apparatus disclosed herein, and the processing time required to obtain the desired end products of such process. Illustrated within the graphed operational area for carbonizable materials of the type generally utilized in the process are more limited bulk density vs. time conditions for specific sub-types of carbonizable material, i.e., shredded tires, coal, sawdust and wood shavings and comminuted municipal waste.

Thus, for example, the graph of FIG. 3 shows that for shredded scrap tires which have a bulk density range of from about 26 lbs./cu. ft. to about 38 lbs./cu. ft., a processing time (or reactor through put time) of about 8 minutes to about 16 minutes is required via the process and apparatus of the present invention under the preferred range of pyrolysis temperatures. To pyrolyze 20 tons per eight hour day of shredded tires having a bulk density average of 32 lbs./cu. ft., at an average processing time of 12 minutes, the pyrolysis zone (in accordance with the invention) would have an actual volume of about 62 cubic feet and an effective volume of about 31 cubic feet. The reaction vessel defining the actual reaction zone above, if having an effect length of about 15 feet, would therefore have an inside diameter of about 2.3 feet. The same reaction vessel used to process feed material comprised of comminuted municipal waste having a bulk density of about 16 lbs./cu. ft. and processing time of 6 minutes would likewise consume about 20 tons per eight hour day of such waste.

EXAMPLES OF THE INVENTION

Illustrative of the efficacy of the process and apparatus of the present invention are the following examples:

EXAMPLE 1

Pyrolysis apparatus, contructed in general accordance with the pyrolysis reaction system and equipment illustrated in FIGS. 1 and 2 is used to pyrolyze scrap tires in accordance with the present invention. Such tires, generally representative of passenger tires which can no longer be used or retreated because of damaged bodies, were shredded into pieces having a maximum dimension of about one inch. The tires, in their unshredded condition, had an average weight of about 25 pounds each and comprised of a normal mixture of bias, bias belted and radial tires including the steel beads or bands in the belted tires. Thus, the tire shreds, used as the feed material for the reaction system, included scraps of steel.

The reaction zone within the pyrolysis system (defined by a cylindrical stainless steel reaction vessel) had an effective length of 10 feet and an inside diameter of 18¼ inches. The actual volume of the reaction zone (taking into account the displacement volume of the materials conveying apparatus comprising impellers and impeller shaft) is calculated to be 16 cubic feet with an effective volume (volume occupied by feed material as a moving bed of decreasing thickness from inlet to outlet end) amounting to 8 cubic feet. The through put rate or reaction zone turn-over-time for the described pyrolysis apparatus (with respect to each type of feed material) is calculated as the time required (minutes) to process 8 cubic feet of feed material in the reaction system.

Following the teachings of the present invention, 1375 pounds of the above described shredded tire feed material is continuously introduced into the reaction zone and is pyrolyzed at 875° C. to fuel gases, liquid hydrocarbons and solid residue in one hour. The feed material (having bulk density of about 32 pounds per cubic foot) had an average residence time within the reaction zone (reaction zone turn-over-time) of 11.2 minutes. The reaction products resulting from the pyrolysis treatment (and gas-vapor separation processing) were collected and reported as follows:

|  | Pounds | Pounds/Ton | Weight Percent |
|---|---|---|---|
| Liquid Hydrocarbons | 560 lbs. | 814 lbs. | 40.7% |
| Char & Other Non-ferrous Residues | 340 | 494 | 24.7 |
| Fuel Gases | 425 | 618 | 30.9 |
| Steel Scraps | 30 | 44 | 2.2 |
| Unaccounted | 20 | 30 | 1.5 |
|  | 1,375 lbs. | 2,000 lbs. | 100.0% |

The 425 pounds of fuel gases had a displacement volume of 7,070 cubic feet with a heating value of about 850 Btu per cubic foot. Medium heavy oils accounted for approximately 70% of the liquid hydrocarbons. About 40% of the produced gas mixture is returned to the heating zone of the pyrolysis reaction system wherein it was utilized as the sole combustible fuel for effecting the pyrolysis reaction.

EXAMPLE 2

Utilizing the pyrolysis apparatus described in the foregoing example and the methodology of the present invention, coal having a bulk density of about 42 pounds per cubic foot is introduced into the reaction zone to be converted into fuel gases, liquid hydrocarbons and high grade coke. Utilizing pyrolyzing temperatures in the reaction zone of about 600° C. during the treatment period and a through put rate or residence time of about 15 minutes, the approximate product yields of a ton of coal are set forth below:

|  | Pounds | Weight Percent |
|---|---|---|
| Tar & Heavy Oils | 320 lbs. | 16.0% |
| Light Oils | 30 | 1.5 |
| Coke | 1,350 | 67.5 |
| Fuel Gases | 100 | 5.0 |
| Water | 200 | 10.0 |
|  | 2,000 lbs. | 100.0% |

The 100 pounds of fuel gases would have a calculated displacement volume of about 1,900 cubic feet and heating value of approximately 900 Btu per cubic foot.

Residence time for the solid carbonizable materials within the reaction zone is closely related to the bulk density of such materials in their shredded comminuted or particulate form. The processing temperatures within the reaction zone principally contribute to the determination of the relative distribution and nature of the end products of the pyrolysis reaction. Thus, the conversion of shredded waste tires (having a bulk density range of 26–38 pounds per cubic foot) to combustible gases and liquids and solid char residue may be accomplished in from 8 to 16 minutes, while the conversion of typical comminuted municipal waste (having bulk density range of 12 to 24 pounds per cubic foot) to generally similar end products is accomplished in about 4 to 10 minutes, in accordance with the present invention. Pyrolysis of shredded tires at about 500° C. (lower end of the processing temperature range) yields principally liquid hydrocarbons and char and limited quantities of hydrocarbon gases. Raising the temperature toward the 900° C. end of the temperature range increases the char content and gas output while decreasing the content of liquid hydrocarbons.

The pressure within the reaction zone is generally maintained at about ambient pressure with a negative pressure continuously applied to the gas-vapor outlet conduit to remove the gas-vapor stream from the reaction zone.

The process and apparatus of the present invention result in a system for recovering valuable energy resources from solid carbonizable materials having the following desirable characteristics:

(1) The system is continuous in its operation (2) The space velocity or reactor velocity of solid carbonizable materials entering and passing through the pyrolysis reaction zone is high.

(3) The capital investment required for constructing and installing the apparatus is low and the apparatus possesses a high operating time factor with low operating costs.

(4) The system is thermally self-sufficient, i.e., all heat and energy requirements (other than start-up fuel) are produced within the system.

(5) The system is highly versatile in its capability of accepting and pyrolyzing a wide variety of solid carbonizable feed material having a reasonably wide range of unit or piece size.

(6) The system, including the pyrolysis apparatus and associated feed material and product handling devices, is mechanically simple and easily operable.

(7) The pyrolysis apparatus operates as a closed, low-pressure oxygen-free system which, with its gaseous fueled heating system, is nonpolluting to the environment.

The examples are only illustrative of the process for the pyrolytic treatment of solid carbonizable materials in accordance with the present invention. It is obvious that one skilled in the art may make modifications in the details of construction of the apparatus and conditions of the process without departing from the spirit of the invention which is set out in varying scope in the appended claims.

What is claimed is:

1. A process for carbonizing a comminuted solid carbonizable material to form combustible gases, vaporous hydrocarbons and solid residue which comprises:
   (a) introducing said comminuted solid carbonizable material into an elongated horizontally-extending reaction zone under conditions to effectively exclude oxygen-containing gases therefrom;
   (b) passing said comminuted solid carbonizable material as a bed through said reaction zone;
   (c) agitating said bed of comminuted solid carbonizable material during passage through said reaction zone;
   (d) introducing a burning mixture of an oxygen-containing combustion gas and fuel into a heating zone surrounding said reaction zone in a manner to spirally pass said burning mixture through said heating zone generally countercurrent to said bed of comminuted solid carbonizable material passing through said reaction zone thereby to carbonize said comminuted solid carbonizable material to form said combustible gases, vaporous hydrocarbons and solid residue;
   (e) withdrawing combusted gases from said heating zone at a point below a horizontal plane passing through the axis of said heating zone;
   (f) withdrawing said solid residue from an outlet end of said reaction zone under conditions to effectively exclude oxygen-containing gases therefrom; and
   (g) withdrawing said combustible gases and vaporous hydrocarbons from said reaction zone under conditions to effectively exclude oxygen-containing gases.

2. To process as defined in claim 1 wherein said combusted gases are withdrawn from said heating zone at a point proximate to the introduction of said comminuted solid carbonizable material.

3. The process as defined in claim 1 wherein said withdrawn combustible gases and vaporous hydrocarbons are separated and wherein a portion of said combustible gases is returned to said process as fuel.

4. The process as defined in claim 1 wherein said reaction zone is maintained at about atmospheric pressure.

5. The process as defined in claim 1 wherein said reaction zone is maintained at a temperature of about 400° C. to about 900° C.

6. The process as defined in claim 1 wherein said comminuted solid carbonizable material comprise shredded tires having a bulk density of from about 26 to about 38 pounds per cubic foot and wherein said comminuted solid carbonizable material is passed through said reaction zone at a through-put rate of from about 8 to about 16 minutes.

7. The process as defined in claim 1 wherein said comminuted solid carbonizable material comprise comminuted coal particles having a bulk density of from about 40 to about 48 pounds per cubic foot and wherein said comminuted solid carbonizable material is passed through said reaction zone at a through-put rate of from about 12 to about 20 minutes.

8. The process as defined in claim 1 wherein said bed of comminuted solid carbonizable material is heated by radiant heat transfer from about said bed and by conductive heat transfer from below said bed.

9. The process as defined in claim 1 wherein said withdrawn combusted gases are exhausted to the atmosphere.

10. The process as defined in claim 1 wherein said comminuted solid carbonizable material is introduced into one end of said reaction zone and said solid residue is withdrawn at the other end of said reaction zone.

11. The process as defined in claim 10 wherein said mixture is introduced into said heating zone at a point proximate said other end of said reaction zone.

12. The process as defined in claim 10 wherein said combustible gases and vaporous hydrocarbons are withdrawn from said reaction zone at said other end of said reaction zone.

13. The process as defined in claim 1 wherein said solid comminuted carbonizable material is selected from the group consisting of comminuted municipal solid wastes; wood chips, shavings, sawdust and like wood particles; coal; and shredded tires.

14. The process as defined in claim 13 wherein said comminuted solid carbonizable material is passed through said reaction zone at a throughput rate in the range of from about 2 to about 25 minutes, said throughput rate being substantially related to a bulk density of said comminuted solid carbonizable material, said bulk density of said comminuted solid carbonizable material being in the range of from about 5 to about 55 pounds per cubic foot.

15. The process as defined in claim 14 wherein said comminuted solid carbonizable material is comprised of wood chips, shavings, sawdust and like wood particles having a bulk density of from about 6 to about 12 pounds per cubic foot and wherein said comminuted solid carbonizable material is passed through said reaction zone at a through-put rate of from about 2 to 5 minutes.

16. The process as defined in claim 14 wherein said comminuted solid carbonizable material comprises comminuted municipal waste having bulk density of from about 12 to about 24 pound per cubic foot and wherein said comminuted solid carbonizable material is passed through said reaction zone at a through-put rate of from about 4 to about 10 minutes.

17. An apparatus for carbonizing comminuted solid carbonizable material to form a gas-vapor mixture and a solid residue which comprises:
(a) a substantially horizontally disposed elongated vessel having end walls forming a reaction zone, said vessel having a solid material inlet conduit, a solid residue outlet conduit and a gas-vapor mixture outlet conduit;
(b) a jacket disposed about said vessel and having end walls thereby forming a heating zone with said vessel, said jacket having an exhaust gas outlet conduit, said gas outlet conduit being positioned at a point below a horizontal plane passing through the axis of said jacket;
(c) feed means in communication with said solid material inlet conduit of said vessel for introducing said comminuted solid carbonizable material into said vessel through said solid material conduit under conditions to effectively exclude oxygen-containing gases therefrom;
(d) means for conveying said comminuted solid carbonizable material through said vessel as an agitated moving bed of said material;
(e) combustion means for introducing a mixture of an oxygen-containing combustion gas and fuel into said heating zone for burning therein, said combustion means being disposed so as to cause said burning mixture to spirally pass through said heat zone about said reaction zone to said exhaust outlet conduit of said jacket in a direction generally counter-current to said agitated moving bed of said comminuted solid carbonizable material;
(f) outlet means in communication with said solid residue outlet conduit of said vessel for removing said solid residue from said vessel through said solid residue oulet conduit under conditions to effectively exclude oxygen-containing gases therefrom; and
(g) outlet means in fluid communication with said gas-vapor mixture outlet conduit of said vessel for withdrawing said gas-vapor mixture from said vessel under conditions to effectively exclude oxygen-containing gases therefrom.

18. The apparatus as defined in claim 17 wherein said elongated vessel is cylindrically-shaped and wherein said jacket is substantially co-extensive with said vessle.

19. The apparatus as defined in claim 18 wherein said jacket is cylindrically-shaped and in co-axial alignment with the axis of said vessel.

20. The apparatus as defined in claim 17 wherein said exhaust gas outlet conduit of said jacket is proximate to said solid material inlet conduit of said vessel.

21. The apparatus as defined in claim 17 wherein said gas-vapor mixture outlet conduit and said solid residue outlet conduit of said vessel are disposed at an end of said vessel opposite said solid material inlet conduit thereof.

22. The apparatus as defined in claim 17 wherein said feed means of said vessel is a vertically disposed conduit allowing for gravity feed of said comminuted solid carbonizable material to said solid material conduit as a gravity packed column, said pipe being of a sufficient length whereby said gravity packed column of said comminuted solid carbonizable material during gravity feed thereof effectively excludes said oxygen-containing gases from said reaction zone.

23. The apparatus as defined in claim 17 wherein said combustion means include burner assembly means mounted on said jacket so as to project a burning mixture issuing from said burner assembly means in a direction generally tangential to the surface of said vessel for circumferential flow thereabout and in a direction toward the exhaust gas outlet conduit of said jacket to cause spiral movement of said burning mixture within said heating zone.

24. The apparatus as defined in claim 23 wherein said burner assembly means includes first and second burner assemblies, said first burner assembly being comprised of one or more burners mounted on said jacket and aligned so as to project one or more streams of a burning mixture issuing therefrom in a direction generally tangential to the outer surface of said vessel for circumferential flow thereabout and in a direction toward the exhaust gas outlet conduit of said jacket and toward said second burner assembly, said second burner assembly comprised of one or more burners mounted on said jacket and aligned so as to project one or more streams of a burning mixture issuing therefrom in a direction generally tangential to the surface of said vessel for circumferential flow thereabout and in a direction toward said exhaust gas outlet conduit of said jacket and toward said first burner assembly to ensure thorough mixing of streams of burning mixtures issuing from said burner assemblies and to cause the spiral movement of combusting gases within said heating zone.

25. The apparatus as defined in claim 17 wherein said means for conveying said comminuted solid carbonizable material through said vessel includes a motor driven rotatable shaft centrally positioned within said vessel throughout the length thereof, said shaft having mounted thereon a plurality of paddle-like impellers which move and agitate said material during rotation of said shaft.

26. The apparatus as defined in claim 25 wherein said paddle-like impellers are arranged in the form of a broken helix.

* * * * *